Dec. 31, 1935. H. T. WHEELER 2,026,409
PACKING RING
Filed Dec. 31, 1931
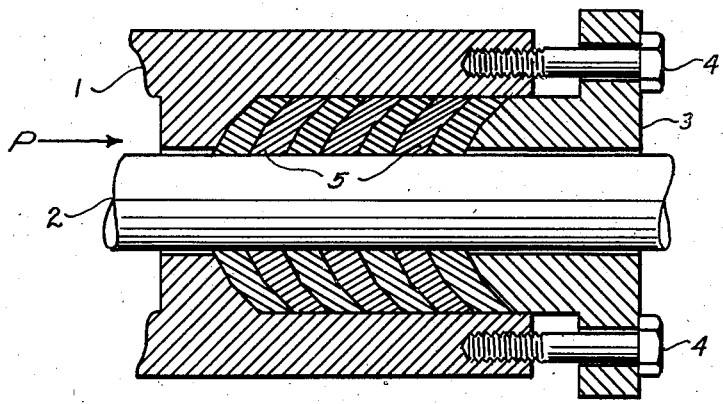
Fig 1
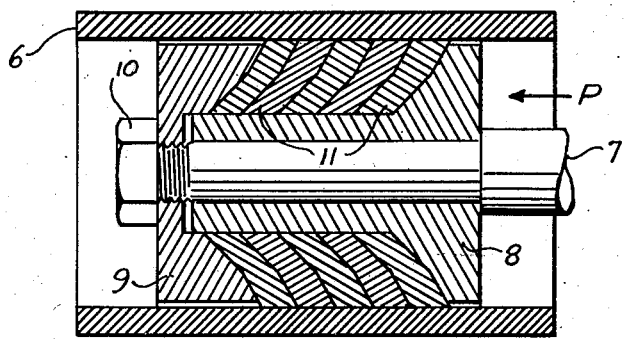
Fig 2
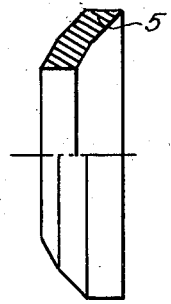 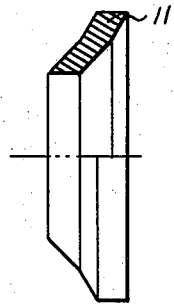
Fig 3  Fig 4
INVENTOR.
Harley T Wheeler Patented Dec. 31, 1935

2,026,409

UNITED STATES PATENT OFFICE 2,026,409

PACKING RING

Harley T. Wheeler, Dallas, Tex.

Application December 31, 1931, Serial No. 584,093

7 Claims. (Cl. 286—26)

This invention is one of a series of improvements for overcoming normal applied pressure, as it may be considered in the creation of friction between a solid body in contact with a porous structure made elastic by pressure, and its chief advantage lies in a method of opposing the normal applied pressure by reactions due to saturation.

An object is to provide packing ring shapes which make use of saturation to offset the creation of friction, or rubbing.

I have as a further object to provide a porous packing ring shaped to seal along a moving surface and to maintain such seal with a minimum of friction.

I also desire to provide a packing ring preferably of porous material and subject to the action of the pressure fluid and to so shape the ring that it will maintain a seal under the effects of reaction occurring therein due to the action of the pressure fluid.

With the foregoing objects and advantages in view, further advantages of shape and applications of the principles stated, will be developed as the description proceeds, accompanied by the drawing, wherein:

Figure 1 is a cross-section of a stuffing-box built to accommodate the frusto-cone packing rings of this invention.

Figure 2 is a cross-section of a piston and liner showing the application of the frusto-conical principle to piston rings.

Figure 3 is a frusto-conical stuffing-box ring, in partial cross-section.

Figure 4 is a frusto-conical piston ring, in partial cross-section.

In considering the friction arising along the moving surface and resulting from the action of the pressure fluid I find that while an increase of pressure must increase the normal load and resulting friction, there are characteristics in a porous structure which act to resist or balance the pressure. I desire to regulate the distribution of pressure so as to control the friction along the rod or cylinder wall.

Referring now to Figure 1, I show a cross-section of a stuffing-box arranged to receive the stuffing-box rings of this invention, the frame of a machine 1 containing the stuffing-box bore. A movable rod 2 extends thru the box and thru an adjustable gland 3, the adjustment being made by the bolts 4, 4. The frusto-conical packing rings 5, as will hereinafter be demonstrated, will seal a pressure P directed according to the arrow.

In Figure 2, is illustrated the application of the frusto-conical piston ring traveling in a liner 6, the piston rod 7 being attached to the piston head 8 by a nut 10, the combination forming a space for the frusto-conical rings 11, the action of the rings being similar to the rings 5 of Figure 1.

Figure 3 shows the shape of the ring 5, used in Figure 1, the cross-section showing two intersecting cones, the inner and outer edges being in concentric cylindrical surfaces for the purpose of sealing the rod and wall surfaces.

Figure 4 shows the rings 11, of Figure 2, the cross-section being two intersecting cones, the inner and outer edges lying in concentric cylindrical planes for the purpose of sealing the piston and liner surfaces.

In working out the particular shape and arrangement of my porous packing rings I have considered the effect of the reaction of the pressure fluid within the pores of the packing material making up the rings or sections. Under these reactions which must be considered may be included the longitudinal reaction which is always parallel to the face of the ring and is due to the tendency of the faces to elongate. There are as many longitudinal reactions as there are ring cross sections. Longitudinal reactions are the property of the ring shape and are a function of the end of the face and the area of the segment. Radial reaction is similar to the lateral reaction and is always present in rings of curved longitudinal sections. It may be defined as the tendency of the ring face to move in the direction of the radius of the curvature.

Other reactions include the peripheral reaction which is one of the most powerful agents in considering friction and is due to the tendency of the ring to change diameters, being considered as any radius lying within the cross section of the annular ring surface. As expansion is approximately proportional to the length of the saturated assembly the outer leg of the ring will expand more than the inner leg under certain porosity relations. The peripheral reaction is solely the property of porosity and the length of the path of saturation. It occurs in every circular porous structure and therefore exists according to the construction or process of manufacture. For example, a ring having a high degree of porosity at the outer periphery will permit a high rate of seepage flow and will expand but little at the circumference. The reverse will become true if the degree of porosity is lowered. It is therefore possible by changing the porosity of the different portions of the ring to meet the various conditions which may be encountered in packing off the pressure fluid in the manner here illustrated.

Another reaction might be noted as reflex action which is an effect of saturation and is due to longitudinal and radial reaction in combination as they occur in curved sections. This effect is similar to the straightening effect in curved pipes under pressure and means a tendency to bend back toward a straight line. It is the most powerful of saturation effects in producing friction. In connection with these reactions which tend to influence the friction of the packing might be noted the film reaction which is the pressure built up by the fluid medium on the surface of the rod or the box wall surface. On a box surface the film may consist of the fluid under pressure while at the rod surface it may be the fluid medium or may be an applied lubricant or a mixture of both.

The effects of saturation are more potent in causing friction than the effects of thrust and mechanical compression. Fortunately, there is a possibility of controlling these forces to offset thrust and compression. It should be apparent that no design can be correct unless all of the known sources of friction are balanced one against another as nearly as possible. I find that when the pressure normally applied due to all of the reactions is equal to the film reaction, there is a perfect seal with the minimum possible friction. When there is an excess of pressure normally applied, or the film reaction is less than the saturation of the adjacent porous structure, there will be friction, that is, an effort will be necessary to overcome it. To sum up, for any width of packing, the minimum friction will be obtained when the pressure of the film is the same as the internal pressure of the adjacent porous structure. The friction which exists will be the rubbing of fibers and loose ends touching the solid body, the points of contact being in suspension in a saturated medium.

The particular form of my packing ring sections as disclosed in the drawing has been worked out by taking into consideration the different reactions which have to be considered. I find that the width of the ring must not be too great and the porosity of the ring may be regulated to suit conditions, ordinarily a fairly porous material which may be folded or not, and may be of fabric or of felt or other similar porous materials. I find the most satisfactory type of porous material to be a woven fabric material which, under some conditions may be asbestos fabric. I aim to vary the material in the porous structure to suit the condition of the particular installation in which the packing is to be used.

By making the rings with what might be called the double taper face, presented toward the pressure fluid, I obtain the shape which most effectively preserves the seal along the moving surface with a minimum amount of friction.

What I claim as new is:

1. For a stuffing-box containing a movable surface and subjected to a fluid medium under pressure, a packing of annular ring shape having edges in contact with said stuffing-box wall and said movable surface, a face exposed to said medium being convex and comprised of two convex curved surfaces intersecting at an angle, said convexity inclining away from the source of said medium, the opposing ring face being comprised by the intersection of two curved concave surfaces.

2. For a stuffing-box containing a stationary and a movable surface and subjected to a fluid medium under pressure, a packing of annular ring shape having edges in contact with said stationary and movable surfaces, a face exposed to said medium being a compound convexity comprised of two convex curved surfaces intersecting at an angle and inclining away from the source of said medium, the opposing ring face being comprised by the intersection of two curved concave surfaces, the thickness of said ring being equal at said stationary and movable surfaces.

3. In a stuffing box having movable and stationary surfaces and subjected to a fluid medium under pressure, a cylindrical packing structure confined between said movable and stationary surfaces and including a series of contiguous annular sections, each of said sections having one end face shaped with a compound convexity inclining away from the source of said medium, the other end face having a parallel concave curved surface, the margins of said sections sealing with said movable and stationary surfaces.

4. For a stuffing-box containing a stationary and a movable surface cylindrical in shape, and subjected to a fluid medium under pressure, a packing of annular ring shape confined between said stationary and movable surfaces, an end face exposed to said medium being comprised of a radial surface perpendicular to said movable surface and intersecting a convex curved surface inclining away from the source of said medium, the opposing end face comprised of intersecting radial and concave curved surfaces the periphery of said packing being cylindrical and adapted to seal against said stationary surface.

5. A packing assembly to seal against leakage of pressure fluid, comprising a plurality of contiguous ring-shaped sections formed for engagement between a cylindrical stationary surface and a cylindrical movable surface, each section having longitudinally curved, approximately parallel end faces and positioned to present a convex surface toward the source of said pressure fluid, the peripheries of said sections lying in said cylindrical surfaces.

6. A packing assembly to seal against leakage of pressure fluid between a movable cylindrical surface and a stationary cylindrical surface, comprising a plurality of contiguous annular sections, the end faces of said sections lying in two intersecting convex surfaces, and the peripheral edges of said sections contacting with said cylindrical surfaces.

7. A packing assembly to seal against leakage of pressure fluid between two concentric cylindrical surfaces, one of which is movable, comprising a plurality of contiguous annular sections, the peripheries of which contact with said surfaces, said sections, each having a compound convex surface inclining outwardly away from the source of said pressure fluid.

HARLEY T. WHEELER.